United States Statutory Invention Registration [19]

[11] Reg. Number: H140

Bruns et al. [43] Published: Oct. 7, 1986

[54] CARBON/CARBON COMBUSTOR EXTERNAL INSULATION

[75] Inventors: Alfred E. Bruns, Elsah, Ill.; Jerry K. Lehman, St. Louis, Mo.; Dallas G. Wetzler, Florissant, Mo.; Harry A. Holman, Jr., Ladue, Mo.

[73] Assignee: The United States of America as represented by the Secretary of the Air Force, Washington, D.C.

[21] Appl. No.: 724,719

[22] Filed: Apr. 18, 1985

[51] Int. Cl.[4] ..... B32B 7/02

[52] U.S. Cl. ..... 428/213; 428/408

[58] Field of Search ..... 428/215, 408

[56] References Cited

U.S. PATENT DOCUMENTS

| | | | |
|---|---|---|---|
| 2,749,254 | 6/1956 | Slyh et al. | 117/46 |
| 2,835,107 | 5/1958 | Ward | 60/35.6 |
| 3,001,362 | 9/1961 | Runton | 60/35.6 |
| 3,174,895 | 3/1965 | Gibson et al. | 428/408 X |
| 3,210,233 | 10/1965 | Kummer et al. | 161/68 |
| 3,573,123 | 3/1971 | Siegel et al. | 428/408 X |
| 3,844,877 | 10/1974 | Wessendorf et al. | 428/408 X |
| 3,853,586 | 12/1974 | Olcott | 428/408 X |
| 3,855,176 | 12/1974 | Skidmore | 260/42.28 |
| 3,918,255 | 11/1975 | Holden | 60/39.65 |
| 3,980,105 | 9/1976 | Myskowski | 138/140 |
| 4,131,708 | 12/1978 | Moores et al. | 428/408 X |
| 4,323,620 | 4/1982 | Iwabuchi et al. | 428/215 |
| 4,487,799 | 12/1984 | Galasso et al. | 428/408 X |

*Primary Examiner*—Richard D. Lovering

*Assistant Examiner*—Eric Jorgensen

*Attorney, Agent, or Firm*—Donald J. Singer; William G. Auton

[57] ABSTRACT

The combustion chambers of ramjet-powered missiles must be thermally insulated to protect adjacent equipment from combustion gas temperatures of 3000° F. or greater. Thermal protection is accomplished in the present disclosure by the hot wall carbon/carbon combustor, and an intermediate-temperature insulation layer composed of "MIN-K 2000" a proprietary product of the Manville Corporation. A portion of the "MIN-K 2000" insulation is allowed to experience temperatures greater than its maximum rated value of 2,000° F. and thermally degrade in the one-time use to which the disclosure is put. However, virgin layers of the "MIN-K" insulation still protect the structure, fuel and electrical components adjacent to the combustion chamber from heat shorts. The present disclosure minimizes the weight and volume of the thermal protection system, resulting in increased missile performance.

8 Claims, 12 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

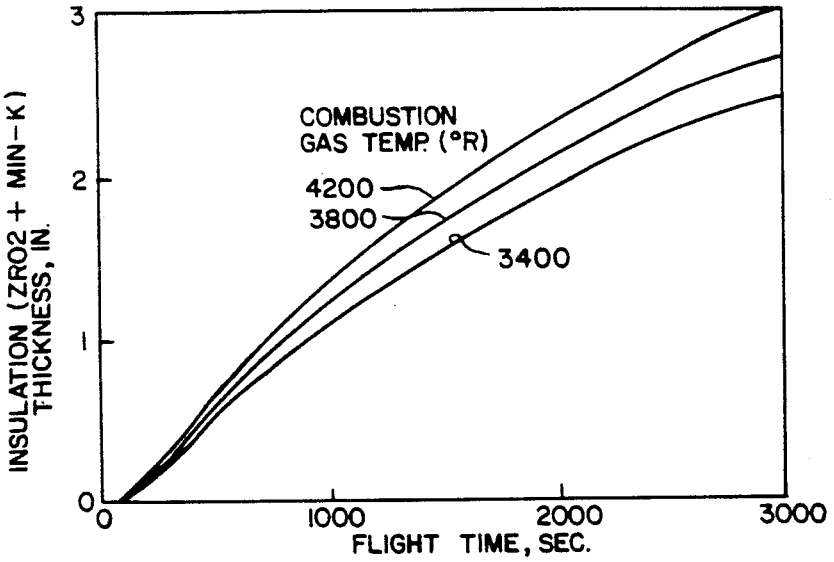
FIG. 8
FIG. 9
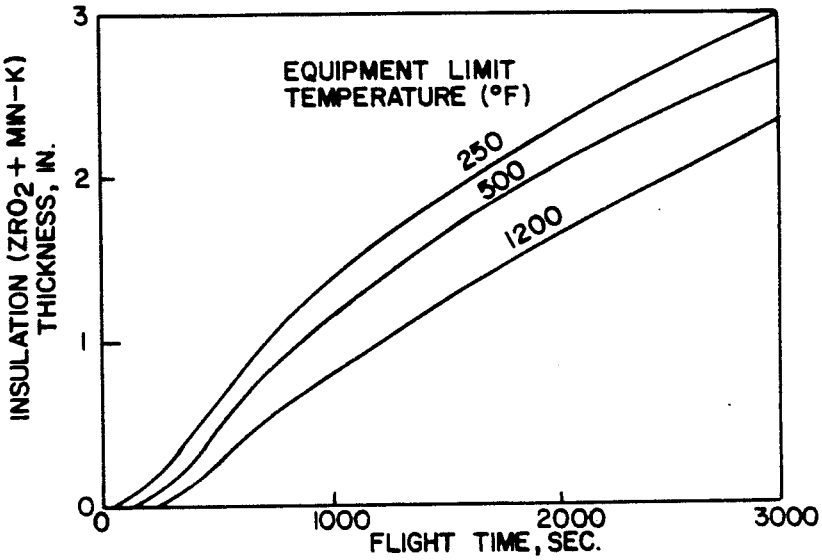
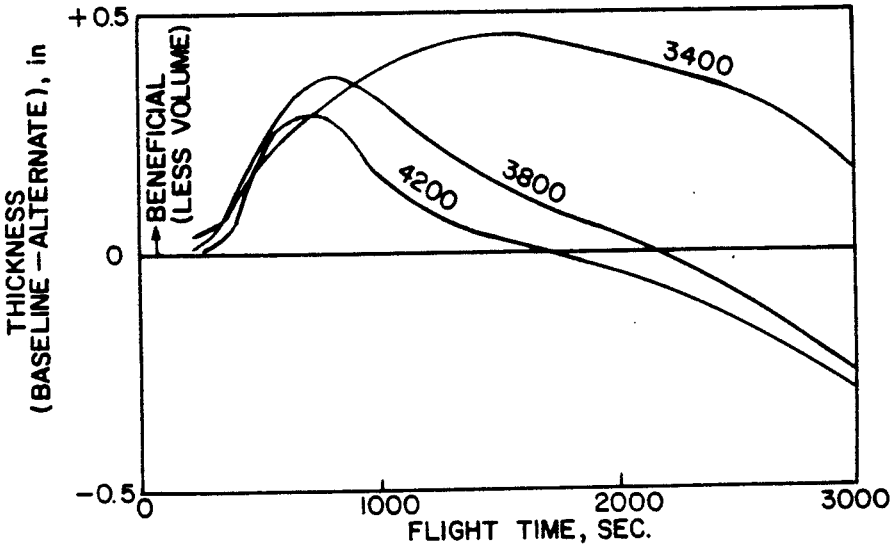
FIG. 10

CARBON/CARBON COMBUSTOR EXTERNAL INSULATION

STATEMENT OF GOVERNMENT INTEREST

The invention described herein may be manufactured and used by or for the Government for governmental purposes without payment of royalty thereon.

BACKGROUND OF THE INVENTION

The present invention relates generally to thermal insulation systems and specifically to external insulation for carbon/carbon combustion chambers of ramjet-powered missiles.

Future long-range missiles are expected to employ ramjet engines operating combustion temperatures of 3000° F. or higher. Carbon/carbon is a prime material candidate for these ramjet combustors because of its high-temperature operational capability. However, adjacent missile equipment and structure must have some form of thermal protection from the high combustor wall temperatures.

Additionally, some future long-range missiles are expected to employ integral-rocket ramjet engines. This engine concept consists of a solid rocket motor case which also serves as a ramjet combustion chamber. During the initial boost phase, when the solid rocket fires, internal pressures are high and wall temperatures are low. Later, during the ramjet phase, internal pressures are low but wall temperatures are high. Carbon/-carbon has enough strength for the high boost pressures and can withstand temperatures as high as 5000° F.

As mentioned above the hot wall combustor must be insulated externally to protect adjacent equipment and structure. A particular prior art thermal protection system (TPS) uses the carbon/carbon combustor wall as one of three layers of different insulation materials for ramjet combustion chambers. Combinations of different insulation materials are often used in separate layers to taylor the thermal protection for the different useful temperature limits of the materials, for changing thermal conditions during a flight as well as for varied flight times. In this prior art TPS, the temperature of each insulation layer is maintained below its useful temperature limit, and no thermal degradation of any material is permitted.

The first layer of the prior art insulation system is the combustor external wall formed from a carbon/carbon composite. Carbon/carbon composites provide ideal combustion chambers since they can withstand temperatures of 5,000° F. and high boost pressures. However, the thermal conductivity of carbon/carbon is relatively high resulting in wall temperatures approaching the combustion gas temperature at steady-state conditions.

The second layer of the prior art insulation system is a layer of zirconia. This insulation layer is deposited upon the external wall of the carbon/carbon combustor. Zirconia has a 4000° F. useful temperature limit which is less than that of carbon/carbon. However, zirconia has a lower thermal conductivity than the carbon/carbon material. The zirconia insulation reduces the hot wall combustor temperature down to the useful temperature limit of the outer insulation layer.

The outer layer of the prior art system is known as "MIN-K 2000", a proprietary insulation material of the Manville Corporation. "MIN-K" is a flexible blankoet material with a quartz cloth facing. This outer insulation layer is used as an intermediate-temperature (2000° F.) insulator between missile equipment and the zirconia layer. "MIN-K" is an ideal thermal insulation because of its low thermal conductivity which is significantly below that of zirconia or carbon/carbon.

The prior art system described above is a functional and effective thermal protection system. However, the TPS should also be minimized for weight and volume efficiency. If less weight and volume are used for the TPS, more of the missile weight and volume can be fuel or payload. Volume is generally the more critical of the two factors. Insulation materials with low thermal conductivity require less material thickness, resulting in weight and volume savings, than higher conductivity insulators.

In view of the foregoing discussion, it is apparent that there currently exists the need for an improved thermal protection system for the combustion chambers of ramjet missiles which would minimize the weight and volume spent for thermal insulation. The present invention is directed towards satisfying that need.

SUMMARY OF THE INVENTION

The present invention is an external insulation system for carbon/carbon combustion chambers of ramjet missiles, wherein the high-temperature zirconia insulation used in prior art systems is eliminated. The insulation system of the present invention includes a carbon/carbon wall in combination with "MIN-K 2000" insulation (a proprietary insulation material packaged in a flexible blanket with a quartz cloth facing) wherein a portion of the "MIN-K" insulation is allowed to degrade in the one-time use to which the invention is put.

The hot wall of the combustion chamber is a carbon/-carbon composite which also serves as the first layer of insulation. The carbon/carbon wall must be designed to withstand boost and ramjet operating pressures, and could be of sufficient thickness to reduce the temperature of combustion down to the useful temperature limit of the adjacent insulation layer. However, carbon/carbon is a poor insulator resulting in a large wall thickness and thus missile weight and volume penalties.

A layer of "MIN-K 2000" is placed on the carbon/-carbon wall to serve as thermal insulation between the hot wall and adjacent missile equipment and structure. This intermediate-temperature (2000° F. limit) insulation layer must be of sufficient thickness to reduce the temperatures down to the following thermal limits: 250° F. to protect electrical equipment, 500° F. to protect fuel system components; and 1,200° F. to protect metal structures.

In this invention, the maximum rated temperature of "MIN-K 2000" is exceeded, and the inner layrs of the "MIN-K" are thermally degraded. However, the virgin, outer layers of the "MIN-K" insulation still maintain the required thermal limits of protection to the adjacent equipment and structure. The intent of this invention is to reduce the volume and weight of the thermal insulation and thus improve missile payload capacity and/or performance.

The present invention avoids the volume penalties which follow the use of the prior art TPS by producing a tailored thermal insulation system which provides sufficient thermal protection while thermally degrading in a planned one-time use. By minimizing the volume and weight of the thermal protection system, missile performance can be significantly improved.

It is a principal object of the present invention to provide a new improved thermal insulation system for the combustion chambers of ramjet missiles.

It is another object of the present invention to provide a thermal insulation system that minimizes the weight of the insulation.

It is another object of the present invention to provide a thermal insulation system that minimizes the volume of the insulation.

It is another object of the present invention to improve the performance of long-ranged supersonic missiles.

These together with other objects, features and advantages of the invention will become more readily apparent from the following detailed description when taken in conjunction with the accompanying drawings wherein like elements are given like reference numeral throughout.

DETAILED DESCRIPTION OF THE DRAWINGS

FIG. 8 is a chart of the insulation requirements of the prior art system of FIG. 1 to protect 250° F. equipment;

FIG. 9 is a chart of the insulation requirements of the prior art system of FIG. 1 to protect 250°, 500° and 1200° F. equipment when the combustion gas temperature is 4200° R.;

FIG. 10 is a comparison between the insulation thickness of the prior art system, and that of the invention to protect 250° F. temperature limited equipment;

DETAILED DESCRIPTION OF THE PREFERRED EMBODIMENT

Figure 1:
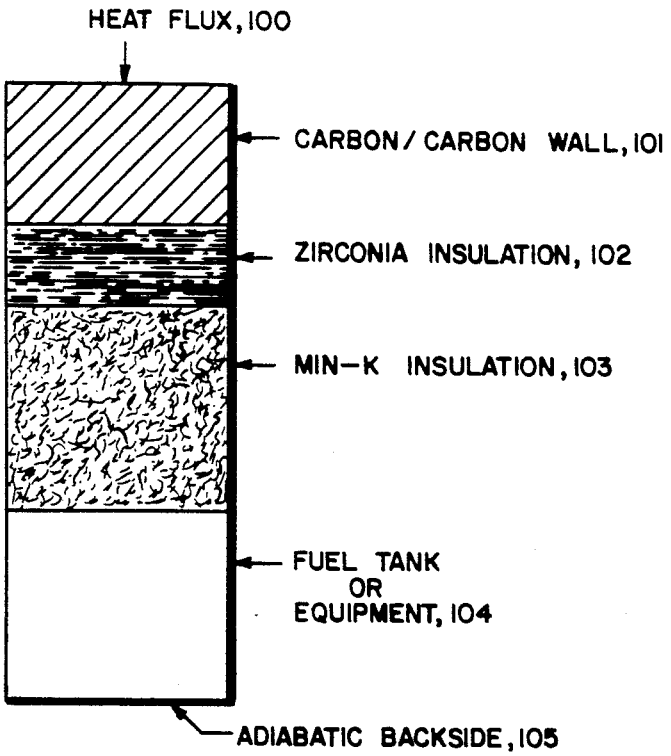
FIG. 1 PRIOR ART
FIG. 1 is a cross section of a prior art thermal protection system.

The present invention is an external insulation system for carbon/carbon combustion chambers of ramjet-powered missiles.

Long-range supersonic missiles will require ramjet combustion chambers which can survive high temperature environments for long flight durations. Carbon/-carbon composites are ideal for ramjet combustors since they can withstand ramjet temperatures of up to 5,000° F. and the high boost pressures experienced in integral-rocket ramjets.

However, adjacent missile equipment and structure will require some form of thermal protection from the high combustor wall temperatures. Typical thermal limits are 250° F. for electrical equipment, 500° F. for fuel system components, and 1,200° F. for structures. A passive thermal protection system i.e., insulation, is desirable because of its low cost, high reliability, and minimal required maintenance. Primary considerations in selecting an insulation material are its useful temperature limit—the maximum temperature at which it can be used with little or no degradation, and a low thermal conductivity (k) and density ($\rho$) product ($k\rho$). Insulation materials can be classified as low-(1,200° F. maximum use), intermediate-(2,500° F. maximum use), and high-temperature (6,500° F. maximum use) insulations. In general, the low- and intermediate-temperature materials are further along in development. They also have lower thermal conductivities, and thus are more volume efficient.

In the selection of a single or combination of insulators for use in a thermal protection system, Table I provides the maximum use temperatures of both intermediate- and high-temperature insulators which are known in the art. This table also provides the density and melting temperature for the listed insulators. Low-temperature insulators were not considered viable.

TABLE I

| INSULATION | DENSITY ($lb/ft^3$) | TEMPERATURE (°F.) MAXIMUM RATED | MELTING |
|---|---|---|---|
| INTERMEDIATE-TEMPERATURE INSULATORS | | | |
| SILICA | 10 | 2600 | 3000 |
| ALUMINA-SILICA | 18 | 2800 | 3200 |
| MIN-K 2000 | 16 | 2000 | — |
| HIGH-TEMPERATURE INSULATORS | | | |
| ALUMINA | 15 | 2800 | 3400 |
| CARBON FELT | 6 | 6500 | SUBLIMES |
| ZIRCONIA (FELT) | 15 | 3500 | 4700 |
| ZIRCONIA (RIGID) | 30 | 3000–4000 | 4000–4700 |

Typically, intermediate-temperature insulations are based on the use of silica or alumina-silica with maximum use temperatures slightly greater than 2,500° F. Higher temperature capabilities are achieved through the use of fibrous alumina, zirconia, or carbon felt. All are available as flexible blankets or in rigid block forms.

Theoretically, the maximum temperature capabilities of these materials are limited by their melting or softening temperatures, which vary from approximately 3,000° F. for silica to 3,200° F. for alumina-silica and 4,700° F. for zirconia. Carbon felt sublimes above 6,500° F., but will oxidize within an air environment at a much lower temperature. In practice, however, shrinkage and/or devitrification occurs at lower temperatures for most materials. Thus, the maximum use temperature is somewhat lower than the melting limit.

While it is possible to use a single layer of high-temperature insulation, prior art systems use separate layers of different insulation materials since the use of high-temperature insulation alone (with its higher thermal conductivity) causes volume penalties that detracts from missile performance. For this reason, it is common among the prior art thermal protection systems to use multiple layers of different insulation materials to protect equipment and structures adjacent to the hot combustion chambers.

FIG. 1 is an illustration of a particular prior art thermal protection system for missiles. The combustion of fuel generates a heat flux 100 with gas temperatures of 3,000° F. or higher.

A carbon/carbon composite 101 serves as the hot wall which is sized to contain the combustion pressure. The carbon/carbon wall 101 also serves as a high-temperature insulator and reduces the external wall temperature down from the combustion gas temperature. The carbon/carbon brings the wall temperature down to within the useful temperature of the next insulation layer.

Zirconia insulation 102 is used to form a layer of high-temperature insulation between the hot wall 101 and intermediate-temperature insulation 103. Its purpose is to reduce the temperature at the hot wall down to the maximum use temperature of the intermediate insulation. Then the layer of intermediate insulation 103 further reduces the temperature to an acceptable level for the adjacent missile equipment and structure.

The intermediate-temperature insulation layer 103 is composed of "MIN-K 2000", a proprietary insulation material of the Manville Corporation, which can be reached at this address:

Manville Corporation
10 Ken-Caryl Ranch
Denver, Colorado 80217

As will be emphasized throughout this disclosure, the thickness of the insulation layers must be minimized to increase the missile volume available for fuel or payload. Insulations with the lowest thermal conductivity offer the required protection with the least thickness, leaving more useful missile volume.

Therefore, it is desirable to improve the prior art thermal protection system of FIG. 1. One observation that makes such improvement possible is that while thermal protection must be provided during the flight time of them missile, reusability is generally not required. The thermal protection system weight and volume can be minimized by a careful and planned one-time use approach in which the insulators are allowed to thermally degrade. Normally, maximum temperatures occur at the end of flight, and the insulation is sized so that the allowable temperature of the equipment, fuel or structure is just reached at that time.

Figure 2:
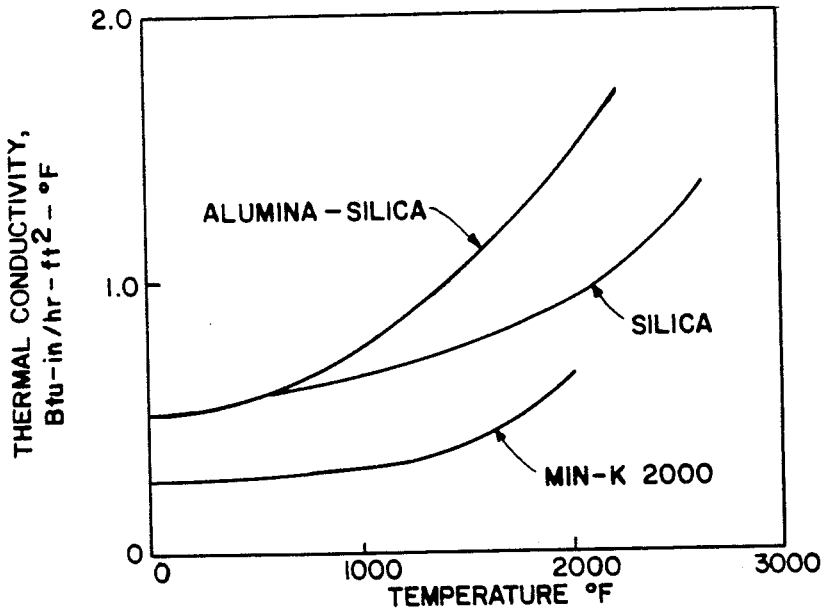
FIG. 2 is a chart showing the insulation properties of three intermediate-temperature insulators.
Figure 3:
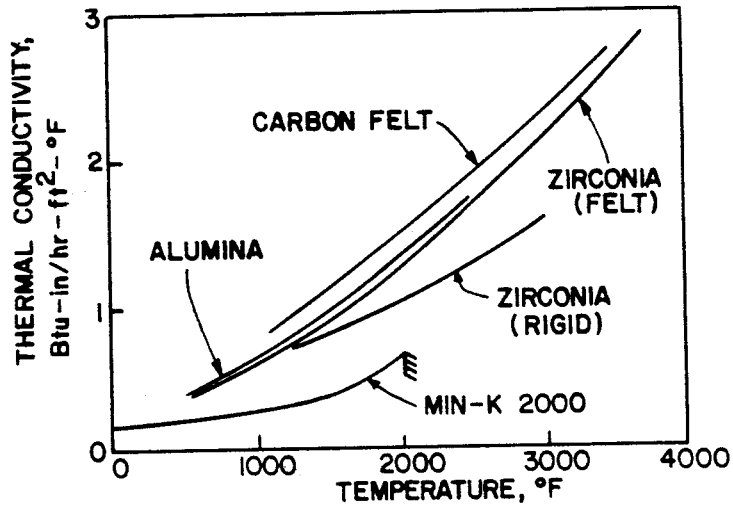
FIG. 3 is a chart showing the insulation properties of several high-temperature insulators.

FIGS. 2 and 3 depict the thermal conductivities of insulators that were considered in the design of the present invention. FIG. 2 illustrates the performance of intermediate-temperature insulators, and FIG. 3 illustrates the performance of high-temperature insulators. The performance characteristics of the insulators in both figures were attained at a pressure of 14.7 psia since only the carbon/carbon wall actually experiences the boost and ramjet pressures.

The values shown in FIG. 2 represent the lowest thermal conductivities among the numerous commercially available products of that generic type. Also shown is the conductivity of "MIN-K 2000". In comparison, "MIN-K 2000" has the lowest conductivity but its temperature limit is about 2,000° F. The thermal conductivities of the high-temperature candidates (which are comparable over 1000° to 4000° F.) are about twice that of "MIN-K 2000" as shown in FIG. 3.

Figure 4:
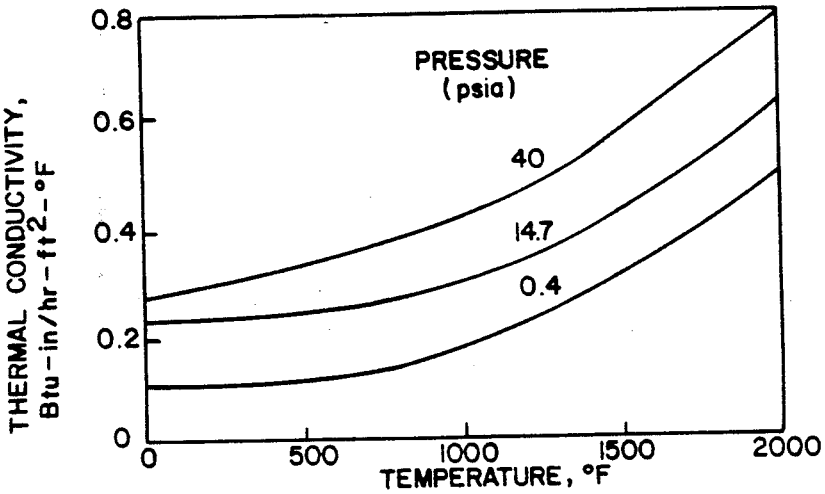
FIG. 4 is a chart showing the effect of pressure on the thermal conductivity of "MIN-K 2000"

Based on these comparisons, "MIN-K 2000" was selected as the preferred intermediate-temperature insulation. "MIN-K" is packaged in a flexible blanket with quartz cloth facing. Blankets are available in standard sizes of ⅛, ¼, ⅜, and ½ inch thickness and can be cut and sewn to fit any shape. FIG. 4 is a chart illustrating the effect of pressure on flexible "MIN-K 2000" thermal conductivity. Since "MIN-K" is a fibrous material, its thermal conductivity is a function of pressure. "MIN-K" becomes more thermally efficient as the pressure is reduced, because the heat transfer due to gas convection and conduction is eliminated as the pressure approaches zero.

Zirconia was selected in the prior art system as the high-temperature material because of its high melt temperature and its inertness in an oxidizing environment. However, the zironia felt is available in only 18 in. by 24 in. sheets in two thicknesses, 0.05 and 0.10 in. Rigid zirconia is available in board form or as cylinders. The felt is fragile, and development work is needed to improve its handling capabilities. The rigid zirconia is quite brittle and work is required to improve its mechanical properties.

Figure 5:
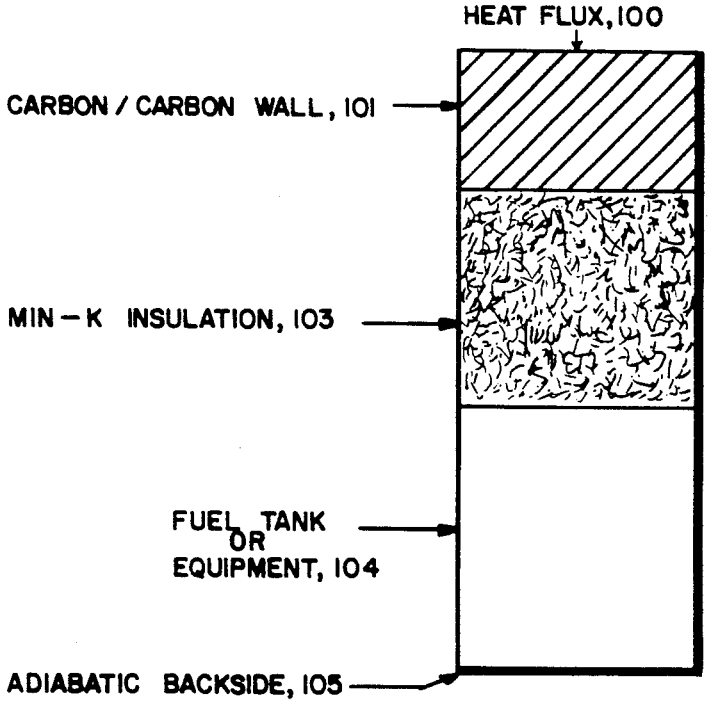
FIG. 5 is a cross section of the present invention.

FIG. 5 is a cross section of the thermal protection system of the present invention. Like the prior art system of FIG. 1, a carbon/carbon composite 101 serves as the hot wall which contains the pressures of combustion. In both the present invention and in the art system, the internal surface of the hot wall 101 is coated with pyrolytic graphite for oxidation protection.

Adjacent to the carbon/carbon wall 101 in FIG. 5 is a layer of intermediate thermal insulation 103 composed of "MIN-K 2000".

The high-temperature zirconia insulation layer 102 of the prior art system in FIG. 1 has been eliminated in the present invention. This is possible for two reasons. First, the thickness of the carbon/carbon wall 101 can be set at values to reduce the temperature down to the maximum useful temperature of the intermediate-temperature insulation 103, but with weight and volume penalties.

The second and principal reason involves the incorporation of a planned one-time use philosophy regarding the thermal protection system. Maximum missile temperatures normally occur at the end of the flight, therefore, the insulation is sized so that the allowable equipment and structure temperatures are reached at that time, while intentionally allowing the intermediate-temperature insulation to thermally dsegrade.

To design the present invention, a test program was conducted to define the performance of "MIN-K" insulation above its rated use temperature of 2,000° F. The program included ramjet testing of subscale carbon/carbon combustors insulated with "MIN-K 2000". In each test, thermal degradation of 1.0 and 0.5-in. layers of virgin "MIN-K" insulation was measured.

Figure 6:
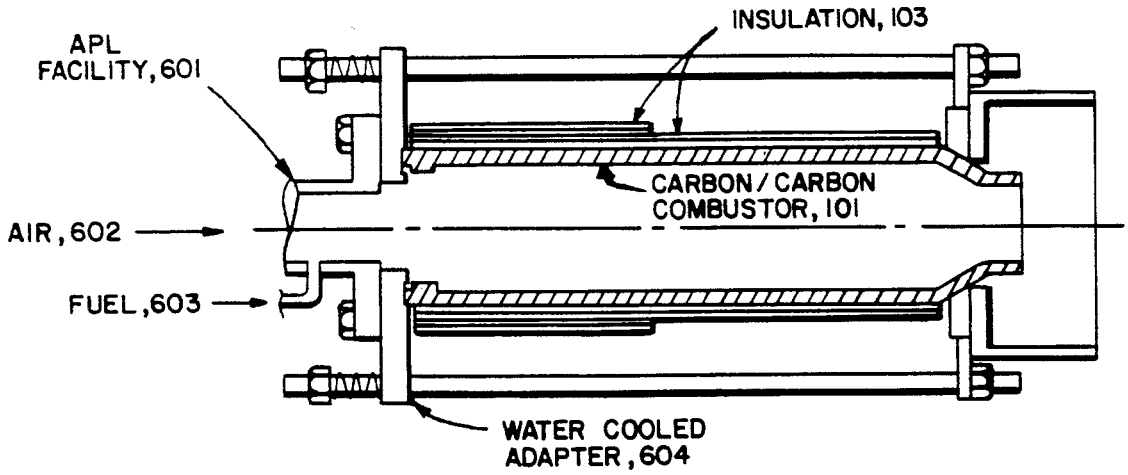
FIG. 6 is a sketch of the equipment used to test the present invention.

To do this, layers 103 of "MIN-K 2000" were installed over a 6.0 in. diameter by 20 in. long carbon/carbon combustor 101 (FIG. 6). Four layers of 0.25-in blanket were wrapped around the forward end of the cylinder, and two layers around the aft end. On two tests, a 0.05-in. thick titanium sleeve was installed over the inner 0.5-in. of insulation to simulate surrounding structure. Thermocouples (platinum versus platinum—10% rhodium) were installed at three radial locations (1) on the hot wall, (2) halfway through the insulation blankets, and (3) on the outside of the blankets to measure thermal gradients and times of degradation. The thermocouple leads were thermally protected with pure alumina ceramic insulators. Conduction errors were eliminated by bringing the leads out through the blanket ends, so that the leads were at the same temperature as that being measured.

Then the combustor and insulation was subjected to transient and steady-state ramjet heating. Combustion gas temperature varied between 3,400° and 3,800° F. and pressure between 30 and 100 psia. Initial temperatures were approximately 70° F. and the insulation was exposed to atmospheric conditions of 70° F. and one atmosphere of pressure. Calculated cold wall heat flux under these conditions was 36 BTU/ft$^2$-sec. Test times varied from 250 to 1400 seconds.

Figure 7:
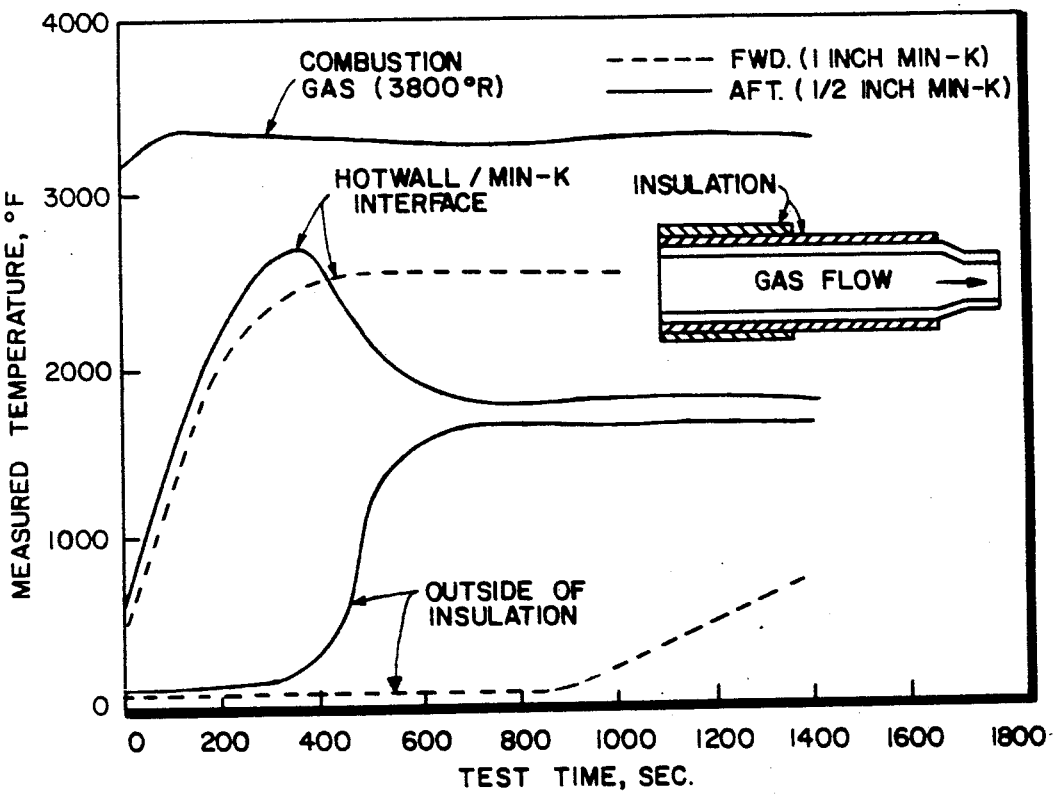
FIG. 7 is a chart of the temperature response of "MIN-K 2000" during ramjet testing.

FIG. 7 depicts measured temperature histories for both the 0.5-in. (2 blankets) layer and the 1.0-in. (4 blankets) layer of insulation. The hot wall/"MIN-K" interface temperature exceeded 2,000° F., the maximum rated temperature of the "MIN-K", in the first 190 seconds of testing. Complete thermal degradation of the inner 0.5-in. layer occurred at about 500 seconds. The outside temperature of the 0.5-in. layer (aft section of the cylinder) increased sharply at this time, and the thermal gradient across the layer decreased form 2,500° F. to about 200° F. The hot wall/"MIN-K" interface temperature decreased as it became influenced by natural convection and radiation to the cooler atmospheric surroundings on the insulation exterior surface. The 1.0-in. layer on the forward end did not degrade completely until about 1,000 seconds of testing. At that time, the temperature on the outside layer began to increase.

Post-test inspection of the 1,000-second test article showed the 0.5-in. "MIN-K" layer had completely degraded. The material had sintered and was very brittle. Its consistency resembled that of a brittle ceramic material. The blanket had shrunk about 3-in. or 16 percent of its total length. The outside layer (0.25-in.) of the 1.0-in. blanket was not degraded. Post-test analysis was conducted to define a thermal performance model of the "MIN-K" insulation above its useful temperature limit.

TPS requirements were then defined and compared for the prior art and present invention to determine the most efficient TPS.

Insulation was sized parametrically for both the prior art and the present invention to limit adjacent equipment temperatures at the end of operation to three distinct levels:

(1) 250° F. for typical electrical equipment, (2) 500° F. for fuel tank components, such as bladders, and (3) 1,200° F. for structural components.

In addition for the prior art system of FIG. 1, the high-temperature zirconia was sized to limit the "MIN-K" interface temperature to 2,000° F. or no "MIN-K" thermal degradation. In the present invention, the "MIN-K" was sized to ensure that the "MIN-K" layer next to the equipment remained virgin to prevent heat shorts.

The insulation thicknesses (of the prior art insulation system of FIG. 1) required to limit surrounding equipment to 250° F. are illustrated in FIG. 8 as a function of flight time and gas temperature. The computations for FIG. 8 were made for ramjet gas temperatures of 3,400° R., 3,800° R., and 4,200° R. Flight times up to 3,000 seconds were considered. Ambient pressure was 0.4 psia simulating 80,000 ft cruise altitude. Insulation thickness requirements are the total for the zirconia and "MIN-K" layers, and are driven by operating time. Gas temperature has little effect for flight times less than 600 seconds. Trends are similar for the 500° F. and 1,200° F. equipment limits.

The sensitivity of the prior art system of (FIG. 1) to varying equipment limit temperatures is presented in FIG. 9 for a gas temperature of 4,200° R. As expected, the insulation requirements are significantly less for the 1200° F. structural limit than for the 250° F. limit.

Data similar to that illustrated in FIGS. 8 and 9 was generated for the present invention of FIG. 5 and compared to the prior art system of FIG. 1 to determine the most volume efficient thermal protection system. The volume penalty associated with the prior art system can be related in terms of the difference between the insulation thickness required for the prior art system and that of the present invention. Insulation thickness increments (prior art system minus that of the present invention) are presented for the equipment temperature limits of 250° F. (FIG. 10), 500° F. (FIG. 11), and 1,200° F. (FIG. 12). Values are shown as a function of flight time and gas temperatures.

A comparison of the two systems shows that for short flight times (less than 300 seconds) the insulation requirements are the same—temperatures at the interface of the hot wall and insulation are low enough that no zirconia insulation layer is needed in the prior art system to prevent "MIN-K" degradation. The time for the hot wall to reach the maximum use temperature (2000° F.) of the "MIN-K" is a function of combustion gas heating, and is essentially independent of the insulation thickness. This time varied nearly linearly from 450 seconds for the 3,400° R. gas temperature to 300 seconds for the 4,200° R. gas.

Figure 11:
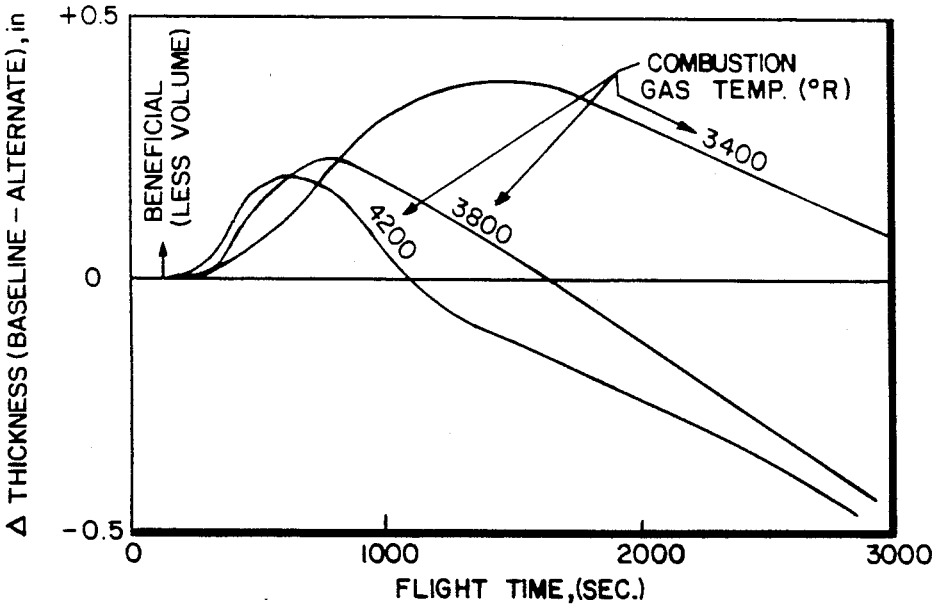
FIG. 11 is a comparison between the insulation thickness of the prior art system, and that of the invention to protect 500° F. temperature limited equipment.
Figure 12:
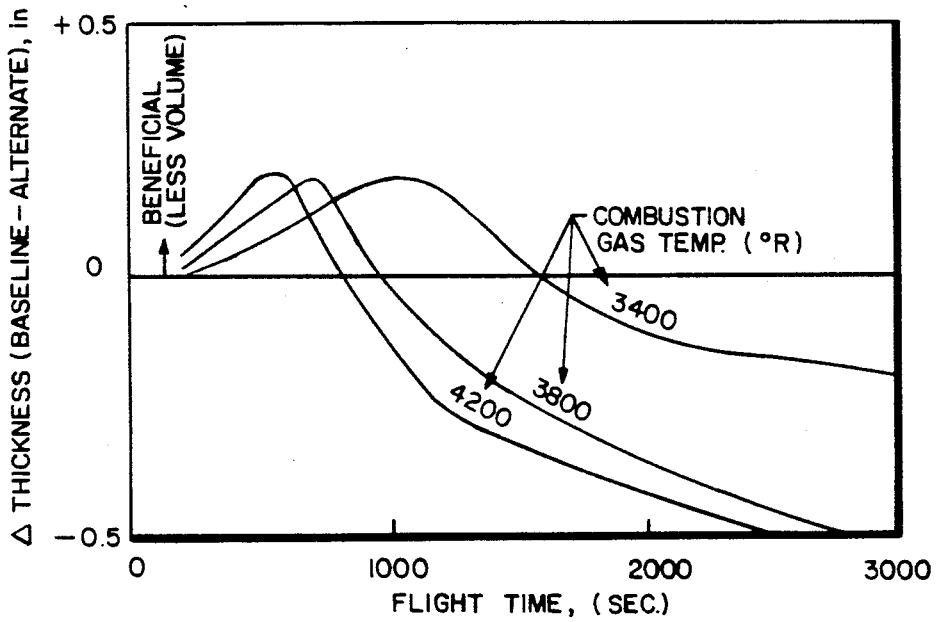
FIG. 12 is a comparison between the insulation thickness of the prior art system, and that of the present invention to protect 1,200° F. temperature limited structures.

As shown in FIGS. 10, 11, and 12, the thermal protection system of the present invention is beneficial (less volume) for:

(1) lower gas temperatures and heating values, (2) short operating times (the crossover time at which the prior art TPS becomes more volume efficient is strongly dependent on the gas temperature and equipment limit temperature), and (3) lower equipment limit temperatures.

For flight times of less than 1,000 seconds and for all gas temperatures and equipment limit temperatures considered, using "MIN-K 2000" above its rated temperature and allowing it to degrade provides a volume-efficient thermal protection system.

An evaluation was conducted for the sensitivity of missile performance to insulation thickness for an air-launched strategic missile. As insulation thickness (or volume) is reduced and replaced with ramjet fuel, missile performance is increased. For a high altitude cruise mission and a 750 second flight time, a 0.1 in. reduction in combustion insulation thickness results in a 2.5 percent increase in missile range, and a 0.5 in. reduction in insulation thickness results in a 15 percent range increase. Based on the results shown in FIG. 11, one can observe that a thickness reduction of 0.25 inches can be achieved using the thermal protection system of the present invention. This results in a potential range increase of 6.5 percent.

The volume savings of the present invention thermal protection system, as mentioned above, is accomplished by allowing the "MIN-K" layer 103 to be heated above its maximum rated temperature and to thermally degrade. However, it should be stressed that this is for a one-time use, and that an outer, virgin layer of "MIN-K" must be maintained to provide the required thermal protection to missile equipment and structure. Additionally, heating of "MIN-K" above its rated temperature should be flight time limited to ensure that equipment and structure maximum rated temperatures are not exceeded.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. An external insulation system for thermally insulating a combustion chamber of a missile, said external insulation system consisting essentially of:

a hot wall being fabricated as said combustion chamber, said hot wall being composed of a carbon/carbon composite, and an intermediate-temperature insulation layer being deposited on the surface of said hot wall to act as thermal insulation between said hot wall and payloads of said missile, said intermediate-temperature insulation layer being composed of an insulation material which begins to thermally degrade at temperatures exceeding about 2,000° F.

2. An external insulation system as defined in claim 1 wherein said hot wall is comprised of:

a carbon/carbon composite having a thickness which allows said intermediate-temperature insulation layer to be heated above its degradation temperature, said insulation degradation temperature being a temperature which causes thermal degradation to said intermediate-temperature insulation layer, said insulation degradation temperature being a temperature of about 2,000° F.

3. An external insulation system as defined in claim 2 wherein said intermediate-temperature insulation layer is comprised of insulation material having a sufficient thickness to insulate payloads which are adjacent to said intermediate-temperature insulation layer in said missile from temperatures exceeding a structural maximum rated temperature, said structural maximum rated temperature being a temperature above which thermal degradation occurs to mechanical structures found in said missile.

4. An external insulation system as defined in claim 3, wherein said structural maximum rated temperature comprises a temperature of about 1,200° F.

5. An external insulation system as defined in claim 2 wherein said intermediate-temperature insulation layer is comprised of insulation material having a sufficient thickness to insulate payloads which are adjacent to said intermediate-temperature insulation layer in said missile from temperatures exceeding a fuel system maximum rated temperature, said fuel system maximum rated temperature being a temperature above which thermal degradation occurs to fuel system components found in said missile.

6. An external insulation system as defined in claim 5, wherein said fuel system maximum rated temperature comprises a temperature of about 500° F.

7. An external insulation system as defined in claim 2 wherein said intermediate-temperature insulation layer is comprised of insulation material having a sufficient thickness to insulate payloads which are adjacent to said intermediate-temperature insulation layer in said missile from temperatures exceeding an electrical system maximum rated temperature, said electrical system maximum rated temperature being a temperature above which thermal degradation occurs to electrical system components found in said missile.

8. An external insulation system as defined in claim 7 wherein said electrical temperature maximum rated temperature comprises a temperature of about 250° F.

* * * * *